United States Patent
Prakash et al.

(10) Patent No.: US 12,351,755 B1
(45) Date of Patent: Jul. 8, 2025

(54) BREAKER FLUIDS FOR REMOVAL OF POLYOLEFIN RESIDUE

(71) Applicant: Halliburton Energy Services, Inc., Houston, TX (US)

(72) Inventors: Chetan Prakash, Pune (IN); Sarai Santos, Ciudad del Carmen (MX); Lalit Pandurang Salgaonkar, Pune (IN); Enrique Antonio Reyes, Houston, TX (US); Marisol Mendez, Ciudad del Carmen (MX); Julio Estuardo Vasquez Estrada, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/401,150

(22) Filed: Dec. 29, 2023

(51) Int. Cl.
C09K 8/524 (2006.01)

(52) U.S. Cl.
CPC .......... *C09K 8/524* (2013.01); *C09K 2208/32* (2013.01)

(58) Field of Classification Search
None
See application file for complete search history.

(56) References Cited

U.S. PATENT DOCUMENTS

| | | |
|---|---|---|
| 8,361,936 B2 | 1/2013 | Mukhopadhyay et al. |
| 10,011,757 B2 | 7/2018 | Dwarakanath et al. |
| 2008/0269081 A1 | 10/2008 | Lin et al. |
| 2009/0221453 A1 | 9/2009 | Mukhopadhyay et al. |
| 2010/0314117 A1* | 12/2010 | Li .......................... C09K 8/524 166/307 |
| 2013/0228334 A1* | 9/2013 | Jiang ..................... C09K 8/685 166/308.2 |
| 2014/0332214 A1* | 11/2014 | Zhou ..................... E21B 43/267 507/224 |
| 2017/0210969 A1* | 7/2017 | Pisanova ................ E21B 37/06 |
| 2018/0187492 A1* | 7/2018 | Amri ....................... E21B 7/28 |
| 2020/0048534 A1 | 2/2020 | Panamarathupalayam et al. |
| 2020/0131432 A1* | 4/2020 | Mahmoud ............... E21B 37/00 |
| 2021/0179930 A1 | 6/2021 | Pinnawala et al. |

FOREIGN PATENT DOCUMENTS

EP 2360223 A1 8/2011

OTHER PUBLICATIONS

International Search Report and Written Opinion mailed Jan. 13, 2025 in PCT/US2024/049497.

* cited by examiner

*Primary Examiner* — Anuradha Ahuja
(74) *Attorney, Agent, or Firm* — The Hilton Firm PLLC

(57) ABSTRACT

Breaker fluids for removing polyolefin agglomerations from wellbore equipment and subterranean formations. An example breaker fluid includes an acid, at least one oxidizer, a corrosion inhibitor, a surfactant, an asphaltene remover, a sludging inhibitor, and an aqueous base fluid. The breaker fluid is introduced to wellbore equipment and subterranean formations and breaks down polyolefin agglomerations present therein.

7 Claims, 9 Drawing Sheets

BREAKER FLUIDS FOR REMOVAL OF POLYOLEFIN RESIDUE

TECHNICAL FIELD

The present disclosure relates generally to wellbore operations, and more particularly, to the use of a breaker fluid for removing a polyolefin agglomeration from wellbore surfaces and wellbore equipment.

BACKGROUND

In some drilling or treatment operations, polyolefins may be used to enhance the filter cake formed on the wellbore wall. Polyolefins may also be used during some slickwater fracturing operations to fracture a subterranean formation. Enhanced oil recovery may be used to enhance production of hydrocarbons by flooding the producing well with sweeping fluids containing chemicals designed to improve the mobility of the oil within. The sweeping fluids used during enhanced oil recovery may also contain polyolefins. After the use of polyolefins, agglomerations of polyolefin residue may form and contaminate the contacted wellbore surfaces and wellbore equipment. Operational conditions such as the wellbore temperature, pump rate of the polyolefin-containing fluids, and the total dissolved solids content of the base fluids may influence the formation of these polyolefin agglomerations. Polyolefin agglomerations may reduce the efficacy of wellbore equipment and oil recovery operations.

The present invention provides improved compositions and methods for removing polyolefin agglomeration from wellbore surfaces and equipment.

Figure 1:
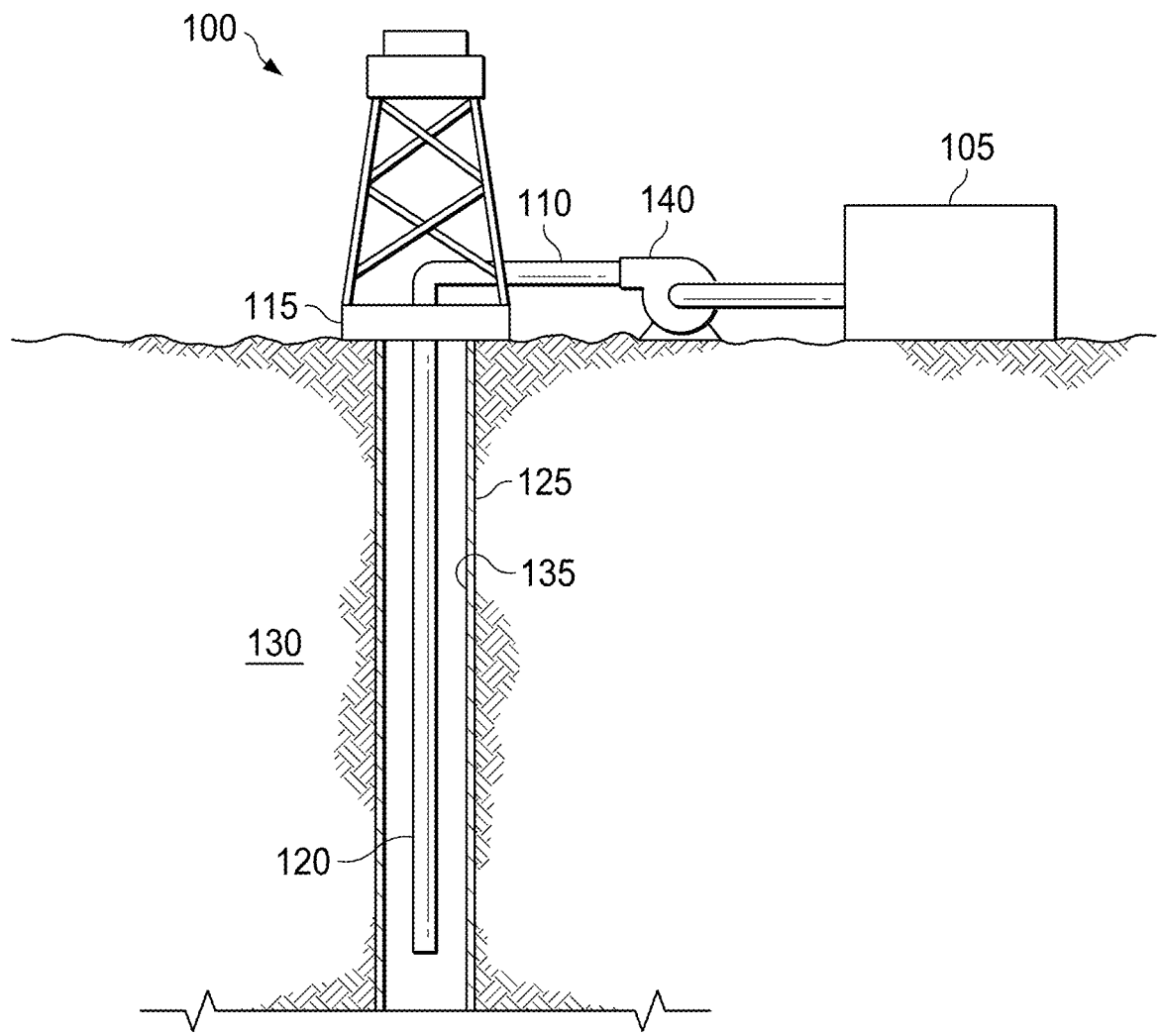
FIG. 1 is a schematic illustrating a system of surface equipment for the preparation and delivery of a breaker fluid to a wellbore in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to wellbore operations, and more particularly, to the use of a breaker fluid for removing a polyolefin agglomeration from wellbore surfaces and wellbore equipment.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The present disclosure relates generally to wellbore operations, and more particularly, to the removal of polyolefin agglomerations from wellbore surfaces and wellbore equipment. The composition and methods disclosed herein may be used to remove polyolefin agglomerations from the surfaces of a wellbore as well as wellbore equipment disposed within the wellbore or removed from the wellbore. The composition described herein is a breaker fluid. The breaker fluid may be used to remove polyolefin agglomerations. The breaker fluid may be prepared by combining an acid, a combination of at least two oxidizers, and an aqueous base fluid.

Advantageously, the breaker fluids disclosed herein may be used to remove polyolefin agglomerations left behind in the wellbore after enhanced oil recovery operations using chemical sweeps. Enhanced oil recovery operations may be conducted in injection and/or producing wells in subterranean formations. Injection wells may be used to drive hydrocarbons into a production well also penetrating the subterranean formation. The injection well and/or the producing well may be treated with the breaker fluid to at least partially remove polyolefin agglomerations on the wellbore surfaces (e.g., rock and/or fracture faces) and wellbore equipment.

Drilling fluids may deposit filter cake on the walls of the wellbore within a subterranean formation extending into the near wellbore area (NWA). The filter cake may prevent the drilling fluid from being lost to the formation as well as prevent the drilling fluid solids and/or drill cuttings from entering the formation. The drilling fluids may be formulated with a polyolefin to enhance filter cake formation on the surface of the wellbore wall. These polyolefins may form agglomerations on the wellbore surfaces and equipment that may impair later wellbore operations. Advantageously, the breaker fluid may remove these polyolefin agglomerations.

During fracturing operations, slickwater fluids may be formulated with polyolefins. These polyolefins may form agglomerations on the fracture faces and/or wellbore equipment. The breaker fluids may be used to treat the contacted surfaces of the fracture faces and wellbore equipment to at least partially remove the polyolefin agglomerations.

In yet another operation, wellbore equipment may be removed from the wellbore and treated with the breaker fluid to remove polyolefin agglomerations formed thereon.

Advantageously, the breaker fluid may be used in high temperature wellbores such as those having temperatures greater than 300° F. and as high as 450° F. As another advantage, the breaker fluid may optionally contain an asphaltene remover to remove asphaltenes and non-paraffinic hydrocarbon components which can be aromatic, benzenoid, or heterocyclic in nature and which may from aggregates due to electrostatic, Van der Waals, and/or London dispersion forces, or with the presence of iron cations. The asphaltenes may be removed from the contacted surfaces of the wellbore and/or wellbore equipment. The permeability range of the breaker fluid may range from about 10 nanodarcy to about 100 darcy and the porosity may range from about 4% to about 40%. The wellbore may be cased, perforated, or an open-hole. The wellbore geometry may be any one or more of the following: vertical, deviated (20/30/40 degrees), horizontal. The wellbore may naturally fractured or hydraulically fractured. The wellbore may be packed with particulates (e.g., gravel pack or frac-pack). A still further advantage is that the breaker fluid may contain a sludging inhibitor or anti-sludge additive to prevent the formation of sludge from the removed and broken down polyolefin and to improve mobility of the removed and broken down polyolefin so that it may be transported out of the wellbore. The sludging inhibitor may also prevent agglomeration of asphaltenic and other polyaromatic, heterocyclic, and/or charged components (molecules) in the crude hydrocarbon in particular with acid (e.g., HCl acid) and ferric (e.g., $Fe^{3+}$) ions or other multivalent and highly charged Lewis acids (e.g., $Zr^{4+}$, $Ti^{4+}$, $Al^{3+}$, $Sb^{5+}$, $Sb^{3+}$). A still further advantage is that the breaker fluid may optionally contain a corrosion inhibitor to prevent the wellbore equipment from corroding when it is contacted with the breaker fluid.

Polyolefins are a type of polymer that is derived from the broader group of olefins (alkenes) via a polymerization reaction. Specific examples of polyolefins which may be broken down and removed by the breaker fluid are polyacrylamide (PAM), partially hydrolyzed polyacrylamide (PHPAM), and hydrolyzed polyacrylamide (HPAM).

PAM and HPAM containing liquids may become extremely viscous after being exposed to heat under wellbore conditions. This in turn may cause agglomerations of PAM and HPAM to form. Additionally, during enhanced oil recovery operations, large quantities of wastewater containing PAM and HPAM is produced. Wastewater coming from the wellbore may have agglomerations of PAM and HPAM entrained. Furthermore, during drilling and/or fracturing operations, a filter-cake may be formed on the permeable surfaces within the wellbore and may further contain agglomerations of PAM and HPAM.

Agglomerations of PAM and HPAM may occur on one or more components or pieces of equipment associated with or which may come into contact with PAM and HPAM such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Additionally, PAM or HPAM agglomerations may form in the subterranean formation, including, but not limited to, the wellbore wall, rock face, or fracture face.

The breaker fluids described herein comprise an acid. In some examples, the acid may be an organic acid. Organic acids may possess a lower reactivity than strong inorganic acids (such as HCl, HNO3) and may be easier to inhibit, requiring lower loadings of corrosion inhibitor. Preferred organic acids may include, but are not limited to, methanesulfonic acid, formic acid, acetic acid, any organic acid having a pKa constant equal to or lower than 3.5. Preferred inorganic or mineral acids may include, but are not limited to, HCl, $H_3PO_4$, HBr, HClO, $HClO_2$, and any combinations. Hydrofluoric acid may be a suitable acid for some formations (e.g., a sandstone formation), or when there is use of siliceous or silicon-containing particulates. In some examples, hydrofluoric acid generating compounds may be used. Examples of hydrofluoric acid-generating compounds may include, but are not limited to, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, bifluoride salts (e.g., ammonium bifluoride), perfluorinated organic compounds, boron trifluoride and various boron trifluoride complexes, derivatives thereof, and any combinations.

The acid hydrolyzes, or breaks down the chemical bonds, of the PAM and HPAM agglomerations, creating smaller molecules. Specific examples of organic and mineral acids may include, but are not limited to, hydrochloric acid, hydrobromic acid, phosphoric acid, hydrofluoric acid, hypochlorous acid, chlorous acid, or formic acid, acetic acid, chloroacetic acid, dichloroacetic acid, trichloroacetic acid, methanesulfonic acid, citric acid, maleic acid, glycolic acid, lactic acid, malic acid, oxalic acid, gluconic acid, succinic acid, tartaric acid, sulfamic acid, lactic acid, thioglycolic acid, sulfamic acid trifluoroacetic acid, propionic acid, butanoic acid, pentanoic acid, hexanoic acid, heptanoic acid, octanoic acid, nonanoic acid, decanoic acid, dodecanoic acid, palmitic acid, stearic acid, sebacic acid, phthalic acid, isophthalic acid, terephthalic acid, adipic acid, pamoic acid, suberic acid, succinic acid, gluconic acid, traumatic acid, thapsic acid, valporic acid, hydroxypropionic acid, or any combinations of acids. Alternately, an acid precursor may be used which may form an acid in the wellbore. Example of the acid precursor may include, but are not limited to, esters of: acetic acid, citric acid, lactic acid, thioglycolic acid, glycolic acid, sulfamic acid formic acid, propionic acid, butanoic acid, pentanoic acid, hexanoic acid, heptanoic acid, octanoic acid, nonanoic acid, decanoic acid, dodecanoic acid, palmitic acid, stearic acid, sebacic acid, phthalic acid, isophthalic acid, terephthalic acid, adipic acid, pamoic acid, suberic acid, succinic acid, traumatic acid, thapsic acid, valporic acid, hydroxypropionic acid, or any combination of esters and/or acids. Preferred acid precursors may include, but are not limited to, esters, aliphatic polyesters, orthoesters, poly(orthoesters), poly(lactides), poly(glycolides), poly(ε-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, the like, any derivative thereof, and any combinations. In some examples, derivatives of the above species may be used. The acid may be provided as a liquid or a solid depending on the species and handling constraints.

The concentration of the acid in a breaker fluid may range from about 0.001% (w/v) to about 15% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the acid in a breaker fluid may range from about 0.001% (w/v) to about 15% (w/v), from about 0.005 (w/v) to about 15% (w/v), from about 0.01 (w/v) to about 15% (w/v), from about 0.05 (w/v) to about 15% (w/v), from about 0.1% (w/v) to about 15% (w/v), from about 0.5% (w/v) to about 15% (w/v), from about 1% (w/v) to about 15% (w/v), from about 2% (w/v) to about 15% (w/v), from about 3% (w/v) to about 15% (w/v), from about 4% (w/v) to about 15% (w/v), from about 5% (w/v) to about 15% (w/v), from about 6% (w/v) to about 15% (w/v), from about 7% (w/v) to about 15% (w/v), from about 8% (w/v) to about 15% (w/v), from about 9% (w/v) to about 15% (w/v), from about 10% (w/v) to about 15% (w/v), from about 11% (w/v) to about 15% (w/v), from about 12% (w/v) to about 15% (w/v), from about 13% (w/v) to about 15% (w/v), or from about 14% (w/v) to about 15% (w/v). As another example, the concentration of the acid in the breaker fluid may range from about 0.001% (w/v) to about 15% (w/v), from about 0.001% (w/v) to about 14% (w/v), from about 0.001% (w/v) to about 13% (w/v), from about 0.001% (w/v) to about 12% (w/v), from about 0.001% (w/v) to about 11% (w/v), from about 0.001% (w/v) to about 10% (w/v), from about 0.001% (w/v) to about 9% (w/v), from about 0.001% (w/v) to about 8% (w/v), from about 0.001% (w/v) to about 7% (w/v), from about 0.001% (w/v) to about 6% (w/v), from about 0.001% (w/v) to about 5% (w/v), from about 0.001% (w/v) to about 4% (w/v), from about 0.001% (w/v) to about 3% (w/v), from about 0.001% (w/v) to about 2% (w/v), from about 0.001% (w/v) to about 1% (w/v), from about 0.001% (w/v) to about 0.5% (w/v), from about 0.001% (w/v) to about 0.1% (w/v), from about 0.001% (w/v) to about 0.05% (w/v), from about 0.001% (w/v) to about 0.01% (w/v), or from about 0.001% (w/v) to about 0.005% (w/v). With the benefit of this disclosure, one of ordinary skill in the art will be readily able to prepare and select an organic acid having a desirable concentration for a given application.

The breaker fluid comprises a combination of at least two oxidizers. After the acid hydrolyzes the chemical bonds of the PAM and HPAM, the oxidizer further breaks down the remaining molecules such that no agglomeration of PAM or HPAM remains. Examples of the oxidizer within the breaker fluid may include, but are not limited to, organic peroxides with the general formula R—O—O—R', where —R and —R' are either both hydrogen or where —R and —R' are either both alkyl/aryl/acyl groups or one of them is hydrogen and other alkyl/aryl/acyl group or where —R' is preferably hydrogen. Additional examples of the oxidizer may include, but are not limited to alkali metal perborates, percarbonates, persulfates, persilicates and perpyrophosphates, or any combination of oxidizers and their mixtures. Some specific examples may include, but are not limited to, sodium perborate monohydrate, sodium perborate tetrahydrate, sodium percarbonate, and sodium pyrophosphate peroxyhydrate, or any combination of oxidizers. Furthermore, the inclusion of suitable precursor agents to generate superoxide anion ($O_2^-$), oxide or hydroperoxyl ($OH_2^-$) radicals, and fluid conditions may lead to chemically reactive transient species, such as reactive oxygen species, that otherwise are not readily available for downhole use.

The total concentration of the oxidizers, including any combination of oxidizers, in the breaker fluid may range from about 0.001% (w/v) to about 10% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the total concentration of the combination of oxidizers in the breaker fluid may range from about 0.001% (w/v) to about 20% (w/v), from about 0.005 (w/v) to about 20% (w/v), from about 0.01 (w/v) to about 20% (w/v), from about 0.05 (w/v) to about 20% (w/v), from about 0.1% (w/v) to about 20% (w/v), from about 0.5% (w/v) to about 20% (w/v), from about 1% (w/v) to about 20% (w/v), from about 2% (w/v) to about 20% (w/v), from about 3% (w/v) to about 20% (w/v), from about 4% (w/v) to about 20% (w/v), from about 5% (w/v) to about 20% (w/v), from about 6% (w/v) to about 20% (w/v), from about 7% (w/v) to about 20% (w/v), from about 8% (w/v) to about 20% (w/v), from about 9% (w/v) to about 20% (w/v), from about 10% (w/v) to about 20% (w/v), from about 11% (w/v) to about 20% (w/v), from about 12% (w/v) to about 20% (w/v), from about 13% (w/v) to about 20% (w/v), from about 14% (w/v) to about 20% (w/v), from about 15% (w/v) to about 20% (w/v), from about 16% (w/v) to about 20% (w/v), from about 17% (w/v) to about 20% (w/v), from about 18% (w/v) to about 20% (w/v), or from about 19% (w/v) to about 20% (w/v). As another example, the concentration of the combination of oxidizers in the breaker fluid may range from about 0.001% (w/v) to about 20% (w/v), from about 0.001% (w/v) to about 19% (w/v), from about 0.001% (w/v) to about 18% (w/v), from about 0.001% (w/v) to about 17% (w/v), from about 0.001% (w/v) to about 16% (w/v), from about 0.001% (w/v) to about 15% (w/v), from about 0.001% (w/v) to about 14% (w/v), from about 0.001% (w/v) to about 13% (w/v), from about 0.001% (w/v) to about 12% (w/v), from about 0.001% (w/v) to about 11% (w/v), from about 0.001% (w/v) to about 10% (w/v), from about 0.001% (w/v) to about 9% (w/v), from about 0.001% (w/v) to about 8% (w/v), from about 0.001% (w/v) to about 7% (w/v), from about 0.001% (w/v) to about 6% (w/v), from about 0.001% (w/v) to about 5% (w/v), from about 0.001% (w/v) to about 4% (w/v), from about 0.001% (w/v) to about 3% (w/v), from about 0.001% (w/v) to about 2% (w/v), from about 0.001% (w/v) to about 1% (w/v), from about 0.001% (w/v) to about 0.5% (w/v), from about 0.001% (w/v) to about 0.1% (w/v), from about 0.001% (w/v) to about 0.05% (w/v), from about 0.001% (w/v) to about 0.01% (w/v), or from about 0.001% (w/v) to about 0.005% (w/v). With the benefit of this disclosure, one of ordinary skill in the art will be readily able to prepare and select a combination of oxidizers having a desirable concentration for a given application.

The breaker fluids described herein comprise an aqueous base fluid, for example, freshwater, saltwater (e.g., water containing one or more salts dissolved therein), brine (e.g., saturated saltwater, including saturated saltwater produced from subterranean formations), seawater, or any combination thereof. Generally, the aqueous base fluid may be from any source provided that the aqueous base fluid does not contain an excess of compounds that may undesirably affect other components in the breaker fluid. In the case of brines, the aqueous base fluid may comprise a monovalent brine or a divalent brine. Suitable monovalent brines may include, for example, sodium chloride brines, sodium bromide brines, potassium chloride brines, potassium bromide brines, ammonium chloride brines, and the like. Suitable divalent brines can include, for example, barium chloride brines, zinc chloride brines, manganese chloride brines, manganese oxide brines, calcium bromide brines, magnesium chloride brines, calcium chloride brines, and the like.

The concentration of the aqueous base fluid in the breaker fluid may range from about 1% (w/v) to about 99% (w/v). The concentration of the aqueous base fluid in the breaker fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the aqueous base fluid in the breaker fluid may range from about 1% (w/v) to about 99% (w/v), from about 5% (w/v) to about 99% (w/v), from about 10% (w/v) to about 99% (w/v), from about 15% (w/v) to about 99% (w/v), from about 20% (w/v) to about 99% (w/v), from about 25% (w/v) to about 99% (w/v), from about 30% (w/v) to about 99% (w/v), from about 35% (w/v) to about 99% (w/v), from about 40% (w/v) to about 99% (w/v), from about 45% (w/v) to about 99% (w/v), from about 55% (w/v) to about 99% (w/v), from about 60% (w/v) to about 99% (w/v), from about 65% (w/v) to about 99% (w/v), from about 70% (w/v) to about 99% (w/v), from about 75% (w/v) to about 99% (w/v), from about 80% (w/v) to about 99% (w/v), from about 85% (w/v) to about 99% (w/v), from about 90% (w/v) to about 99% (w/v), or from about 95% (w/v) to about 99% (w/v). As another example, the concentration of the aqueous base fluid in the breaker fluid may range from about 1% (w/v) to about 99% (w/v), from about 1% (w/v) to about 95% (w/v), from about 1% (w/v) to about 90% (w/v), from about 1% (w/v) to about 85% (w/v), from about 1% (w/v) to about 80% (w/v), from about 1% (w/v) to about 75% (w/v), from about 1% (w/v) to about 70% (w/v), from about 1% (w/v) to about 65% (w/v), from about 1% (w/v) to about 60% (w/v), from about 1% (w/v) to about 55% (w/v), from about 1% (w/v) to about 50% (w/v), from about 1% (w/v) to about 45% (w/v), from about 1% (w/v) to about 40% (w/v), from about 1% (w/v) to about 35% (w/v), from about 1% (w/v) to about 30% (w/v), from about 1% (w/v) to about 25% (w/v), from about 1% (w/v) to about 20% (w/v), from about 1% (w/v) to about 15% (w/v), from about 1% (w/v) to about 10% (w/v), or from about 1% (w/v) to about 5% (w/v). With the benefit of this disclosure, one of ordinary skill in the art will be able to prepare a breaker fluid having a sufficient concentration of an aqueous base fluid for a given application.

In some optional examples, the breaker fluids may further comprise an additive. The additive may be used to adjust a property of the breaker fluid, for example, viscosity, density, etc. Examples of the additives include, but are not limited to, chelating agents, silica scale control additives, corrosion inhibitors, surfactants, gel stabilizers, anti-oxidants, polymer degradation prevention additives, relative permeability modifiers, scale inhibitors, iron control agents, particulate diverters, salts, fluid loss control additives, gas, catalysts, clay control agents, dispersants, mutual solvents and/or organic solvents (e.g., polar, non-polar), flocculants, scavengers (e.g., $H_2S$ scavengers, $CO_2$ scavengers or $O_2$ scavengers), gelling agents, water control and/or water shut-off agents, lubricants, friction reducers, bridging agents, viscosifiers, weighting agents, solubilizers, hydrate inhibitors, consolidating agents, bactericides, clay stabilizers, breakers, delayed release breakers, asphaltene removers, sludging inhibitors, the like, or any combination thereof. With the benefit of this disclosure, one of ordinary skill in the art and the benefit of this disclosure will be able to formulate a breaker fluid having properties suitable for a desired application.

The breaker fluid comprises a surfactant for preventing the breaker fluid from emulsifying under heat within the wellbore. In some examples, the surfactant may increase the sweep and penetration efficiency of the breaker fluid. Examples of the surfactant within the breaker fluid may include, but are not limited to, ethoxylated nonyl phenol phosphate esters, nonionic surfactants, cationic surfactants, anionic surfactants, amphoteric/zwitterionic surfactants, alkyl phosphonate surfactants, linear alcohols, nonylphenol compounds, alkyoxylated fatty acids, alkylphenol alkoxylates, ethoxylated amides, ethoxylated alkyl amines, betaines, methyl ester sulfonates, hydrolyzed keratin, sulfosuccinates, taurates, amine oxides, alkoxylated fatty acids, alkoxylated alcohols, lauryl alcohol ethoxylate, ethoxylated nonyl phenol, ethoxylated fatty amines, ethoxylated alkyl amines, cocoalkylamine ethoxylate, betaines, modified betaines, alkylamidobetaines, cocamidopropyl betaine, quaternary ammonium compounds, trimethyltallowammonium chloride, trimethylcocoammonium chloride, or combinations thereof.

The total concentration of the surfactant in the breaker fluid may range from about 0.001% (w/v) to about 10%

(w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the total concentration of the surfactant in the breaker fluid may range from about 0.001% (w/v) to about 10% (w/v), from about 0.005 (w/v) to about 3% (w/v), from about 0.01 (w/v) to about 3% (w/v), from about 0.05 (w/v) to about 3% (w/v), from about 0.1% (w/v) to about 3% (w/v), from about 0.5% (w/v) to about 3% (w/v), from about 1% (w/v) to about 3% (w/v), or from about 2% (w/v) to about 3% (w/v). As another example, the concentration of the surfactant in the breaker fluid may range from about 0.001% (w/v) to about 10% (w/v), from about 0.001% (w/v) to about 2% (w/v), from about 0.001% (w/v) to about 1% (w/v), from about 0.001% (w/v) to about 0.5% (w/v), from about 0.001% (w/v) to about 0.1% (w/v), from about 0.001% (w/v) to about 0.05% (w/v), from about 0.001% (w/v) to about 0.01% (w/v), or from about 0.001% (w/v) to about 0.005% (w/v). With the benefit of this disclosure, one of ordinary skill in the art will be readily able to prepare and select a surfactant having a desirable concentration for a given application.

The breaker fluid may optionally comprise a corrosion inhibitor to at least partially reduce corrosion of the wellbore equipment by the acid or other wellbore corrosives. Examples of the corrosion inhibitor for use with the breaker fluid may include, but are not limited to, quaternary nitrogen containing compounds, aldehyde-containing compounds, and Mannich reaction products, thiazole, derivatives thereof, or any combinations. Additionally, an intensifier agent may be necessary in formations where the temperature exceeds the capability of the corrosion inhibitor(s) to prevent excessive and damaging corrosion to the wellbore tubing and equipment. Examples of intensifier agents generally comprise a group 15 metal source chosen from the group consisting of: antimony trioxide; antimony tetraoxide; antimony pentoxide; an antimony halide compound; antimony trichloride; antimony pentachloride; antimony trifluoride, antimony pentafluoride; antimony tartrate; antimony citrate; an alkali metal salt of antimony tartrate; antimony citrate; potassium pyroantimonate; an antimony adduct of ethylene glycol; a bismuth oxide compound; bismuth trioxide; bismuth tetraoxide; bismuth pentaoxide; a bismuth halide; bismuth trichloride; bismuth tribromide; bismuth triiodide; bismuth tartrate; bismuth citrate; an alkali metal salt of bismuth tartrate, an alkali metal salt of bismuth citrate; a bismuth oxyhalogen; or any mixtures thereof.

The total concentration of the corrosion inhibitor in the breaker fluid may range from about 0.001% (w/v) to about 5% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the total concentration of the corrosion inhibitor in the breaker fluid may range from about 0.001% (w/v) to about 5% (w/v), from about 0.005 (w/v) to about 5% (w/v), from about 0.01 (w/v) to about 5% (w/v), from about 0.05 (w/v) to about 5% (w/v), from about 0.1% (w/v) to about 5% (w/v), from about 0.5% (w/v) to about 5% (w/v), from about 1% (w/v) to about 5% (w/v), from about 2% (w/v) to about 5% (w/v), from about 3% (w/v) to about 5% (w/v), or from about 4% (w/v) to about 5% (w/v). As another example, the concentration of the corrosion inhibitor in the breaker fluid may range from about 0.001% (w/v) to about 5% (w/v), from about 0.001% (w/v) to about 4% (w/v), from about 0.001% (w/v) to about 3% (w/v), from about 0.001% (w/v) to about 2% (w/v), from about 0.001% (w/v) to about 1% (w/v), from about 0.001% (w/v) to about 0.5% (w/v), from about 0.001% (w/v) to about 0.1% (w/v), from about 0.001% (w/v) to about 0.05% (w/v), from about 0.001% (w/v) to about 0.01% (w/v), or from about 0.001% (w/v) to about 0.005% (w/v). With the benefit of this disclosure, one of ordinary skill in the art will be readily able to prepare and select a corrosion inhibitor having a desirable concentration for a given application.

The breaker fluid may optionally comprise an asphaltene remover for removing asphaltenes which accumulate on wellbore equipment within the wellbore. The asphaltene remover is a required component in wellbore operations in which the polyolefin contaminants are coated with or mixed with asphaltenes. Examples of the asphaltene remover within the breaker fluid may include, but are not limited to, deasphalted oil or polar organic solvents wherein the polar solvents comprise heavy aromatic naphtha, cyclohexanone, N-methyl pyrrolidone, N-ethyl-2-pyrrolidone, dimethylformamide, dimethyl sulfoxide and combinations of asphaltene removers.

The total concentration of the asphaltene remover in the breaker fluid may range from about 0.001% (w/v) to about 5% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the total concentration of the asphaltene remover in the breaker fluid may range from about 0.001% (w/v) to about 5% (w/v), from about 0.005 (w/v) to about 5% (w/v), from about 0.01 (w/v) to about 5% (w/v), from about 0.05 (w/v) to about 5% (w/v), from about 0.1% (w/v) to about 5% (w/v), from about 0.5% (w/v) to about 5% (w/v), from about 1% (w/v) to about 5% (w/v), from about 2% (w/v) to about 5% (w/v), from about 3% (w/v) to about 5% (w/v), or from about 4% (w/v) to about 5% (w/v). As another example, the concentration of the asphaltene remover in the breaker fluid may range from about 0.001% (w/v) to about 5% (w/v), from about 0.001% (w/v) to about 4% (w/v), from about 0.001% (w/v) to about 3% (w/v), from about 0.001% (w/v) to about 2% (w/v), from about 0.001% (w/v) to about 1% (w/v), from about 0.001% (w/v) to about 0.5% (w/v), from about 0.001% (w/v) to about 0.1% (w/v), from about 0.001% (w/v) to about 0.05% (w/v), from about 0.001% (w/v) to about 0.01% (w/v), or from about 0.001% (w/v) to about 0.005% (w/v). With the benefit of this disclosure, one of ordinary skill in the art will be readily able to prepare and select an asphaltene remover having a desirable concentration for a given application.

The breaker fluid comprises a sludging inhibitor for preventing the breaker fluid forming an overly viscous sludge within the wellbore. Examples of the sludging inhibitor within the breaker fluid may include, but are not limited to, ethoxylated alcohols, methanol, alkylbenzene sulfonate, and alkylbeneze.

The total concentration of the sludging inhibitor in the breaker fluid may range from about 0.001% (w/v) to about 5% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the total concentration of the sludging inhibitor in the breaker fluid may range from about 0.001% (w/v) to about 5% (w/v), from about 0.005 (w/v) to about 5% (w/v), from about 0.01 (w/v) to about 5% (w/v), from about 0.05 (w/v) to about 5% (w/v), from about 0.1% (w/v) to about 5% (w/v), from about 0.5% (w/v) to about 5% (w/v), from about 1% (w/v) to about 5% (w/v), from about 2% (w/v) to about 5% (w/v), from about 3% (w/v) to about 5% (w/v), or from about 4% (w/v) to about 5% (w/v). As another example, the concentration of the sludging inhibitor in the breaker fluid may range from about 0.001% (w/v) to about 5% (w/v), from about 0.001% (w/v) to about 4% (w/v), from about 0.001% (w/v) to about 3% (w/v), from about 0.001% (w/v) to about 2% (w/v), from about 0.001% (w/v) to about 1% (w/v), from about 0.001% (w/v) to about 0.5% (w/v), from about 0.001% (w/v) to about 0.1% (w/v), from about 0.001% (w/v) to about 0.05% (w/v), from about 0.001% (w/v) to about 0.01% (w/v), or from about 0.001% (w/v) to about 0.005% (w/v). With the benefit of this disclosure, one of ordinary skill in the art will be readily able to prepare and select a sludging inhibitor having a desirable concentration for a given application.

The present disclosure provides breaker fluids, methods, and systems for treating a subterranean formation. The breaker fluids comprise an acid, a combination of at least two oxidizers, a corrosion inhibitor, a surfactant, an asphaltene remover, a sludging inhibitor, and an aqueous base fluid. The methods may include contacting a surface contaminated with polyolefin with the breaker fluid. The methods may include pumping the breaker fluid into a wellbore penetrating a subterranean formation. The methods may also include introducing the breaker fluid into a portion of the subterranean formation from the wellbore. The systems may include pumping and mixing equipment to convey the breaker fluid to the interval of the wellbore comprising the target subterranean formation. The system may further include contacting wellbore equipment contaminated with a polyolefin.

In some optional examples, an exothermal fluid may be introduced into the wellbore before or after the introduction of the breaker fluid. The exothermal fluid may comprise sodium nitrite or a nitrite salt with ammonium chloride or an ammonium salt as well as a base fluid to convey the same. The exothermal fluid may be used to create an exothermic reaction downhole. The generated heat from the exothermic reaction may improve the capability of the breaker fluid to remove the polyolefin agglomerations by lowering the viscosity of the aggregated polyolefin or polymer residue, by increasing the rate of reaction of the oxidizer and/or acid agent with said polyolefin, and/or by further assisting in bond breaking of the polyolefin aggregate that has become a recalcitrant material due to its residence in the subterranean environment. When introduced after the breaker fluid, the exothermal fluid may be introduced immediately after, or up to about 1 to 10 hours after the introduction of the breaker fluid. When introduced before the breaker fluid, the exothermal fluid may be introduced immediately before, or up to about 1 to 10 hours before the introduction of the breaker fluid. In some examples, the introduction of the exothermal fluid may be repeated as desired or the exothermal fluid may be repeatedly introduced and alternated with the introduction of the breaker fluid. In some embodiments, different ratios of ammonium salt to nitrite salt that can be used, with the objective to manage the exothermic reaction in terms of heat release and location within the wellbore.

Example systems may comprise a pump fluidly coupled to a tubular, the tubular containing a breaker fluid as described herein. The pump may be a high-pressure pump. As used herein, the term "high-pressure pump" will refer to a pump that is capable of delivering a fluid downhole at a pressure of about 1000 psi or greater. A high-pressure pump may be used when it is desired to introduce the breaker fluid to a subterranean formation at or above a fracture gradient of the subterranean formation, but it may also be used in cases where fracturing is not desired. In some examples, the high-pressure pump may be capable of fluidly conveying particulate matter into the subterranean formation. Suitable high-pressure pumps may include, but are not limited to, floating piston pumps and positive displacement pumps. In other examples, the pump may be a low-pressure pump. As used herein, the term "low-pressure pump" will refer to a pump that operates at a pressure below 1000 psi, for example, a pressure of 100 psi. In some examples, a low-pressure pump may be fluidly coupled to a high-pressure pump that is fluidly coupled to the tubular. That is, the low-pressure pump may be configured to convey the breaker fluid to the high-pressure pump. In such examples, the low-pressure pump may "step up" the pressure of the breaker fluid before it reaches the high-pressure pump. In any example, a high-pressure pump and/or a low-pressure pump may convey the breaker fluid to the location of a target subterranean formation. In further examples, a low-pressure pump may be fluidly coupled to the tubular such that the low-pressure pump may convey the breaker fluid to the location of a target subterranean formation. The high-pressure pumps may supply sufficient pressure to allow the breaker fluid to fracture the subterranean formation. That is, the pumps may meet or exceed the fracture gradient of the subterranean formation.

In some examples, the systems described herein may further comprise a mixing tank that is upstream of the pump and is the vessel in which the breaker fluid is formulated. In various examples, the pump (e.g., a low-pressure pump, a high-pressure pump, or a combination thereof) may convey the breaker fluid from the mixing tank to the transporting conduit. In other examples, the breaker fluid may be formulated offsite and transported to a worksite, in which case the breaker fluid may be introduced to the transporting conduit via the pump either directly from its shipping container (e.g., a truck, a railcar, a barge, or the like) or from a transport pipeline. In either case, the breaker fluid may be drawn into the pump, elevated to an appropriate pressure, and then introduced into the transporting conduit for delivery downhole.

When desired for use, the components of the breaker fluid may be combined to prepare the breaker fluid as desired. The components and additives of the breaker fluid may be added or introduced to one another in any order and at any time during the use of the breaker fluid.

FIG. 1 illustrates a schematic of the surface and near-surface portions of a system that can deliver the breaker fluids described herein to a downhole location, according to one or more examples. It should be noted that while FIG. 1 generally depicts a land-based system, it is to be recognized that like systems may be operated in subsea locations as well. As depicted in FIG. 1, system 100 may include mixing tank 105, in which a breaker fluid may be formulated. The breaker fluid may be conveyed via line 110 to wellhead 115, where the breaker fluid enters tubular 120. Tubular 120 may extend from wellhead 115 into a wellbore 125 penetrating subterranean formation 130. Wellbore 125 may be any type of wellbore including vertical, horizontal, deviated, etc. The illustrated portion of wellbore 125 is cased with a casing 135. It is to be understood that in some examples wellbore 125 may be uncased. Upon being ejected from tubular 120, the breaker fluid may subsequently enter into subterranean formation 130 as described in FIG. 2 below. Pump 140 may be configured to raise the pressure of the breaker fluid to a desired degree before its introduction into tubular 120. The breaker fluid may be introduced into the wellbore 125 to at least partially remove an agglomeration of polyolefin from the wellbore equipment, the rock face, or a fracture face. The breaker fluid may be introduced into the wellbore 125 during or after drilling of the wellbore 125. Additionally, the breaker fluid may be introduced into the wellbore during or after fracturing of the wellbore 125. Further, the breaker fluid may be introduced into the wellbore during or after performing an enhanced oil recovery operation in the wellbore 125. Moreover, the breaker fluid may be introduced into the wellbore during or after treating the wellbore 125, for example, treating the wellbore with a fluid pill such as with a fluid loss control pill.

Although not depicted in FIG. 1, the breaker fluid may, in some examples, flow back to wellhead 115 and exit subterranean formation 130. In some optional examples, the breaker fluid that has flowed back to wellhead 115 may subsequently be recovered and recirculated to subterranean formation 130.

Figure 2:
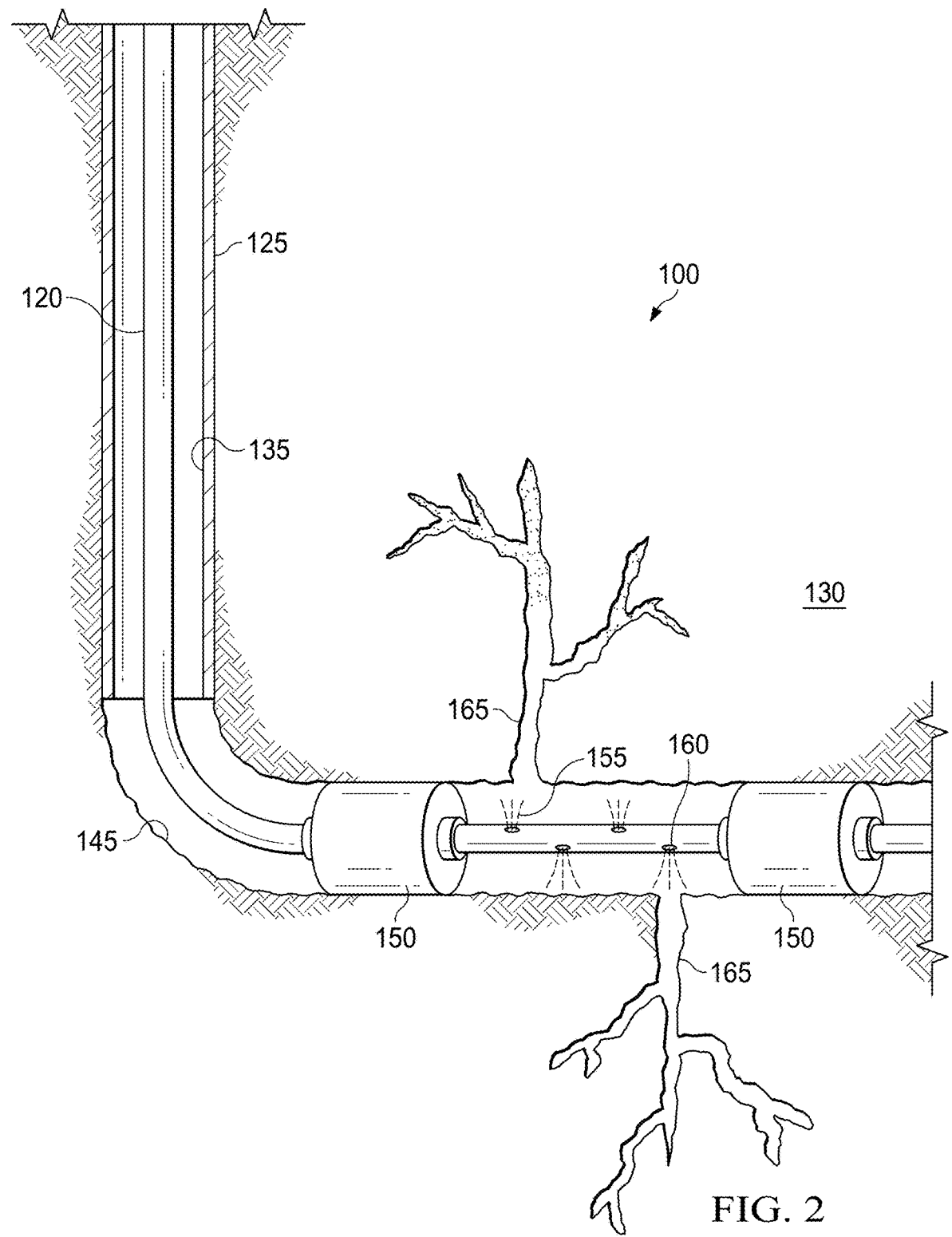
FIG. 2 is a schematic illustrating the placement of a breaker fluid into a fracture in a subterranean formation in accordance with one or more examples described herein.

FIG. 2 illustrates a schematic of the downhole portion of the system 100 illustrated in FIG. 1, according to one or more examples. In the example of FIG. 2, the breaker fluid is introduced into the wellbore after a fracturing fluid has been used to form one or more fractures into the subterranean formation 130. The previously introduced fracturing fluid may have been a slickwater fluid comprising one or more polyolefins. Additionally, or alternatively, the rock faces or fracture faces may have become contaminated with agglomerated polyolefins after formation of the filter cake during a drilling or subsequent treatment operation. The agglomerated polyolefins may be difficult to remove from the rock and/or fracture faces to restore formation permeability.

As depicted in FIG. 2, tubular 120 extends from the wellhead 115 (as illustrated in FIG. 1) into wellbore 125 penetrating subterranean formation 130. After descending through the heel 145 of the wellbore 125, tubular 120 may be coupled to one or more packers 150 positioned to isolate an interval of wellbore 125. A breaker fluid 155, as described herein, may exit tubular 120 through openings 160. The breaker fluid 155 may be introduced into the subterranean formation 130 via a primary fracture 165 of other such opening into the subterranean formation 130. The breaker fluid 155 may contact the fracture faces and/or rock faces of the subterranean formation 130 to remove polyolefin agglomerations, including PAM and HPAM, from the fracture faces or rock faces. The breaker fluid 155 and the removed polyolefin agglomerations may then be flowed out of the wellbore 125.

In some examples, the wellbore penetrating the subterranean formation comprises a temperature greater than about 70° F., about 100° F., about 150° F., about 200° F., about 250° F., about 300° F. about 300° F., about 400° F., or about 450° F.

It is to be recognized that system 100 is merely exemplary in nature, and various additional components may be present that have not necessarily been depicted in FIGS. 1 and 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

It should be clearly understood that the examples illustrated by FIGS. 1 and 2 are merely general applications of the principles of this disclosure in practice, and a wide variety of other examples are possible. Therefore, the scope of this disclosure is not limited in any manner to the details of FIGS. 1 and 2 as described herein.

Figure 3:
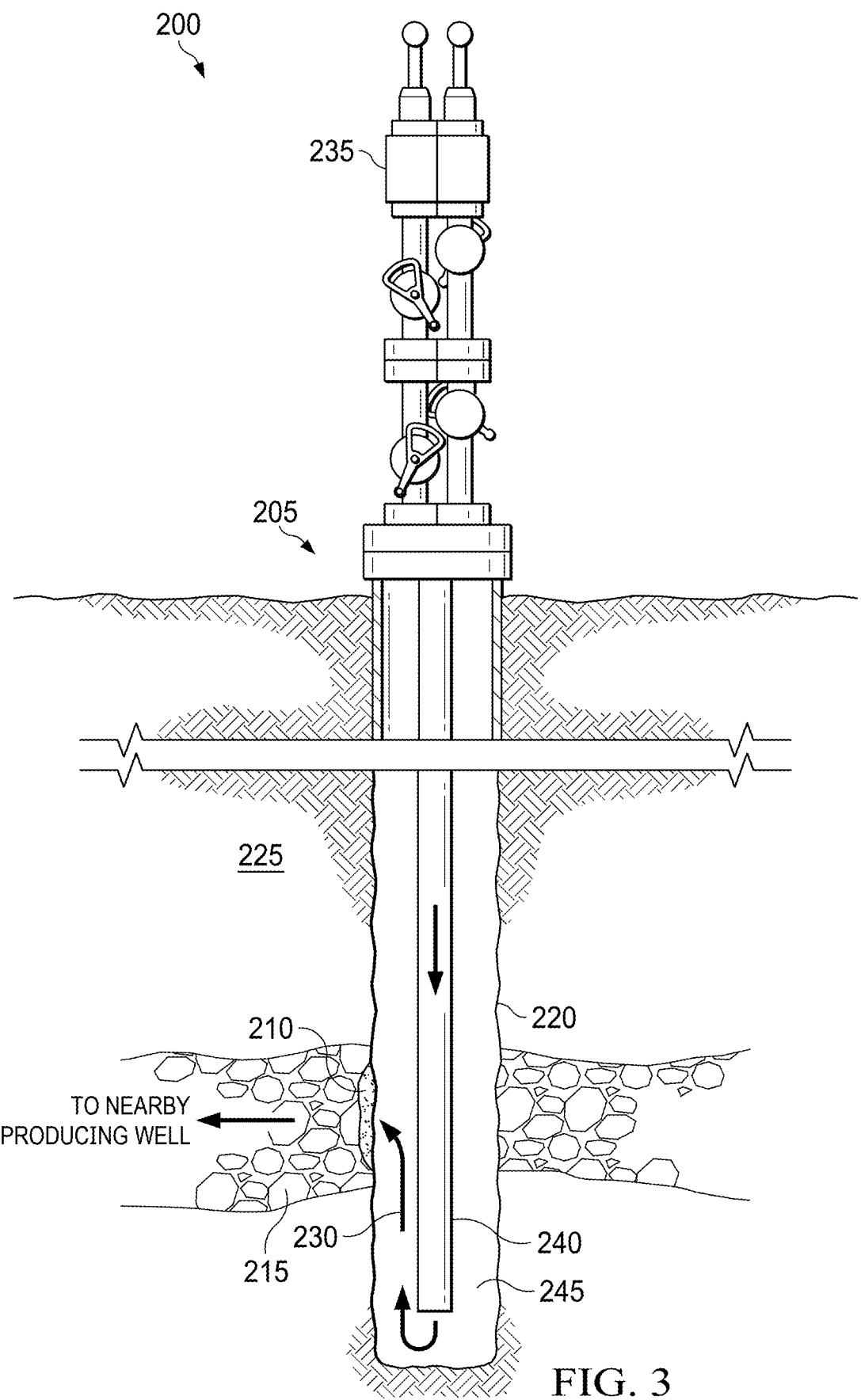
FIG. 3 is a schematic illustrating the treatment of an injection well in accordance with one or more examples described herein.

FIG. 3 is a schematic showing one example of an injection operation 200 being conducted in an injection well 205. For simplicity of illustration, some portions of the injection well 205 are illustrated as uncased; however, it is to be understood that the injection well 205 may have portions that are cased or uncased as desired. After drilling and completion, filter cake 210 may remain at the rock interface 215 of the subterranean formation 225 with the wellbore 220. The filter cake 210 may hinder flow through of injection fluids into the subterranean formation 225 due to being agglomerated with polyolefins such as PAM and HPAM. To improve injectivity, the filter cake 210, as well as other formation damaging materials, may be removed. A breaker fluid 230 may be introduced into the wellbore 220 via the Christmas tree 235, or any other sufficient injection point into the wellbore 220. In the illustrated example, the breaker fluid 230 has been pumped down a tubing 240 to the bottom of the wellbore 220 and up through the annulus 245 where it may contact filter cake 210. The breaker fluid 230 may be pumped to treat as long a wellbore 220 interval as desired. The acid within the breaker fluid 230 may react with the acid-dissolvable components in the filter cake 210 and remove the agglomerated polyolefin. As the breaker fluid 230 treats the wellbore 220, it is not flowed back, but may enter into the subterranean formation 225. Although the breaker fluid 230 is illustrated as being injected through the Christmas tree 235 and into tubing 240, it is to be understood that in alternative examples, the breaker fluid 230 may be pumped directly down the annulus 245 to the treatment interval in a reverse circulation operation.

After treatment with the breaker fluid 230 is completed, a subsequently pumped injection fluid may be introduced into the subterranean formation 225 from the injection well 205, to drive hydrocarbons into a producing well also penetrating subterranean formation 225. It is to be understood that in some examples, the breaker fluid may be introduced directly into the production well for treatment of any polyolefin agglomeration on a rock face of the wellbore wall, a fracture face, and/or on the surface of any wellbore equipment disposed within.

It should be clearly understood that the treatment of the injection well 205 illustrated by FIG. 3 is merely a general application of the principles of this disclosure in practice, and a wide variety of other examples are possible. Therefore, the scope of this disclosure is not limited in any manner to the details of FIG. 3 as described herein.

Figure 4:
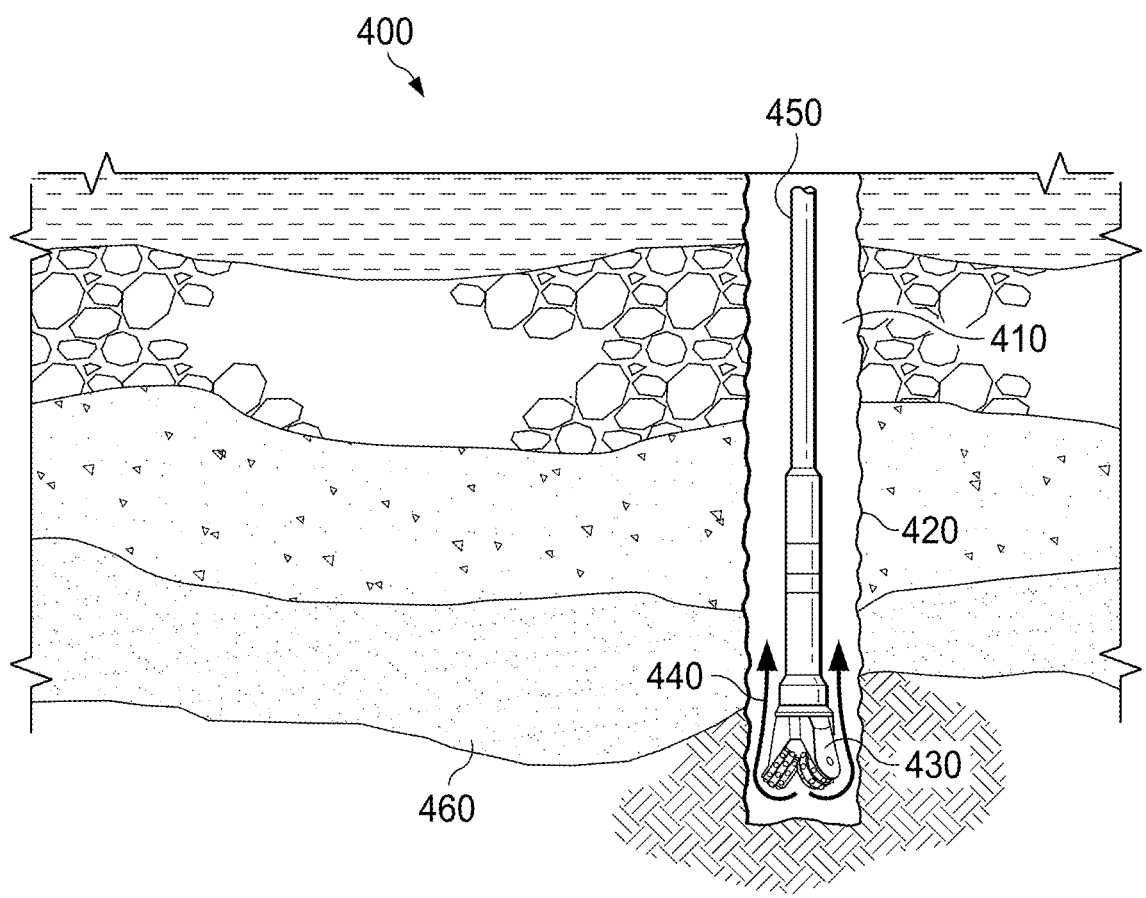
FIG. 4. is a schematic illustrating the treatment of a wellbore and a drilling system with a breaker fluid in accordance with one or more examples described herein.

FIG. 4 is a schematic representation for treating a wellbore containing a drilling assembly 400 with a breaker fluid. A drill bit 430 is attached to the distal end of a drill string 450 and is driven either by a downhole motor and/or via rotation of the drill string 450 from the well surface. As the drill bit 430 rotates, it creates the wellbore 420 penetrating the subterranean formation 460. The drilling assembly 400 also includes a pump at the surface (not shown) that circulates a drilling fluid 440 to the drill string 450, down the interior of the drill string 450, through one or more orifices in the drill bit 430, and into an annulus 410 between the drill string 450 and the walls of the wellbore 420. The drilling fluid may contain polyolefins, such as PAM, PHPAM, and HPAM, which may become agglomerated in the wellbore 420 and/or on the drill bit 430 during drilling operations. After drilling, the breaker fluid may be introduced into the drill string 450 to remove agglomerated polyolefins which may have formed during drilling operations. The agglomerated polyolefins may be removed as part of a filter cake removal process to restore permeability before with the formation. Moreover, polyolefin agglomerations on the drill bit and drill string may also be removed by the breaker fluid.

Figure 5:
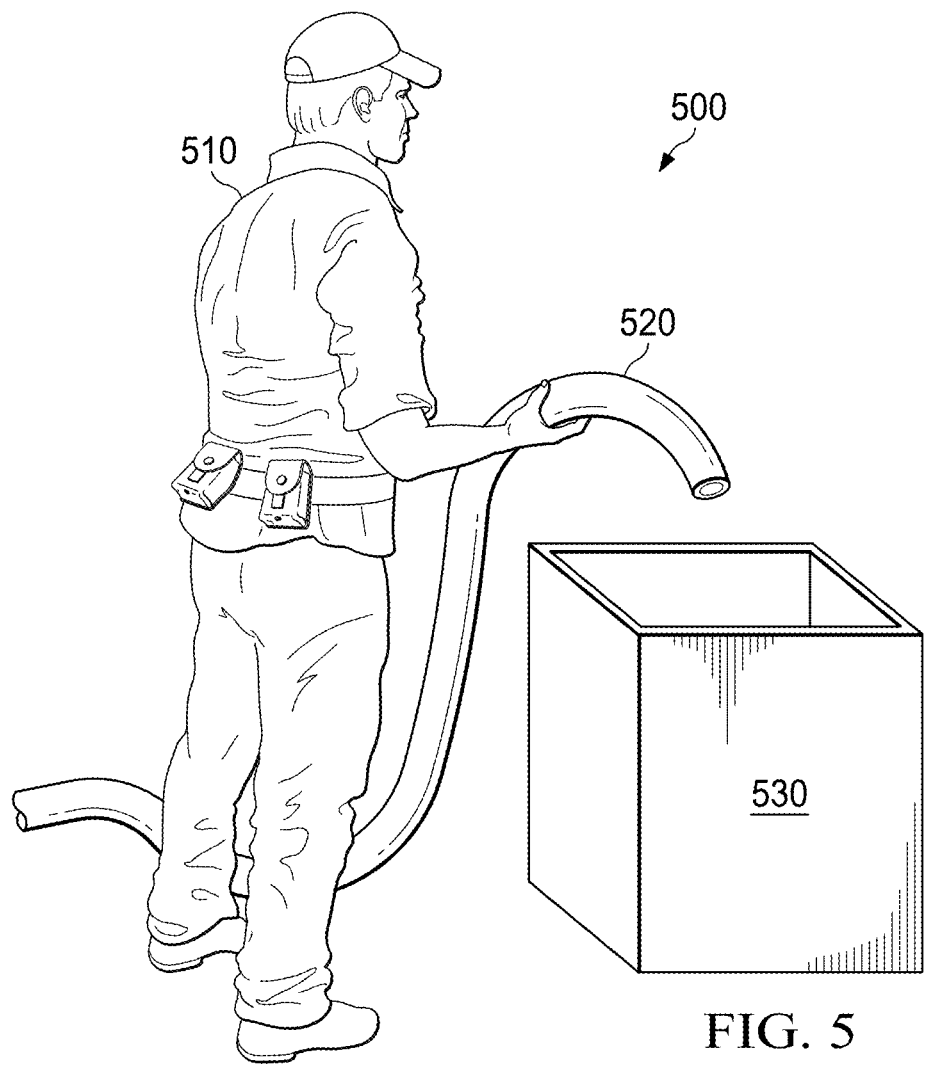
FIG. 5 is a schematic illustrating the cleaning of wellbore equipment with a breaker fluid after the wellbore equipment has been removed from the wellbore in accordance with one or more examples described herein.

FIG. 5 illustrates a process 500 for cleaning off wellbore equipment that has been removed from the wellbore. A user 510 uses a hose 520 or other conduit to contact wellbore equipment 530 that has been removed from a wellbore with the breaker fluid in order to remove agglomerations of polyolefins. Agglomerations of polyolefins may occur on one or more components or pieces of wellbore equipment associated with or which may come into contact with the polyolefins such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

In some examples, the breaker fluid may be left to soak after its introduction so as to contact, solvate, and mobilize the polyolefin residue. The breaker fluid may be allowed to remain in contact with the polyolefin residue for a sufficient period of time so as to solvate at least a portion, and preferably substantially all, of the polyolefin residue. For example, at least 5 wt. %, at least 25 wt. %, at least 50 wt. %, at least 75 wt. %, or at least 100 wt. % of the polyolefin residue that is contacted by the breaker fluid may be solvated by the breaker fluid. In some examples, the breaker fluid may be left to soak for a time period of 1 day to 30 days or 1 hour to 6 days. In some examples, the wellbore may be shut in to allow the breaker fluid sufficient time to solvate the polyolefin residues.

To facilitate a better understanding of the present embodiments, the following examples of certain aspects of some embodiments are given. In no way should the following examples be read to limit, or define, the entire scope of the embodiments.

EXAMPLES

An experiment was conducted to compare the effect of a breaker fluid on a polyolefin agglomeration containing HPAM. A beaker containing the breaker fluid and an agglomeration of HPAM was maintained at 167° F. for six days. The results indicate that the agglomeration had completely broken down after six days.

Figure 6A:
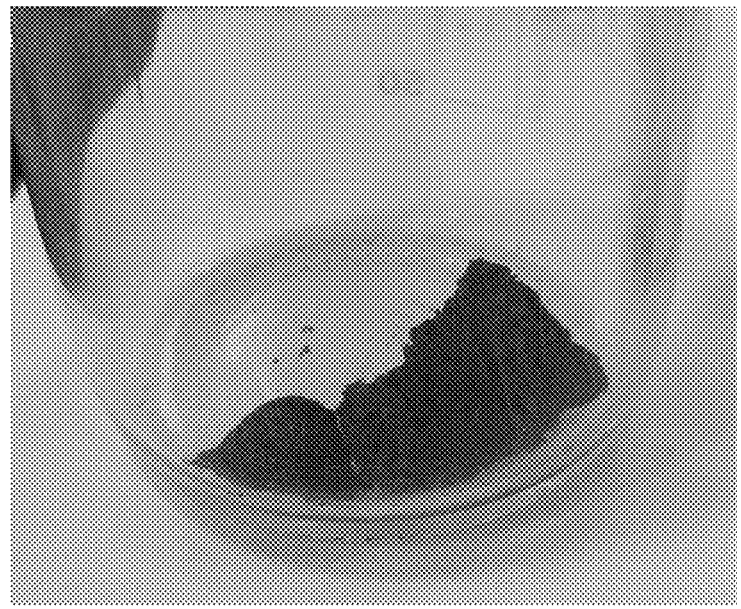
FIGS. 6A-G show an experiment performed on an agglomeration of polyolefin material using a breaker fluid in accordance with one or more examples described herein.
Figure 6B:
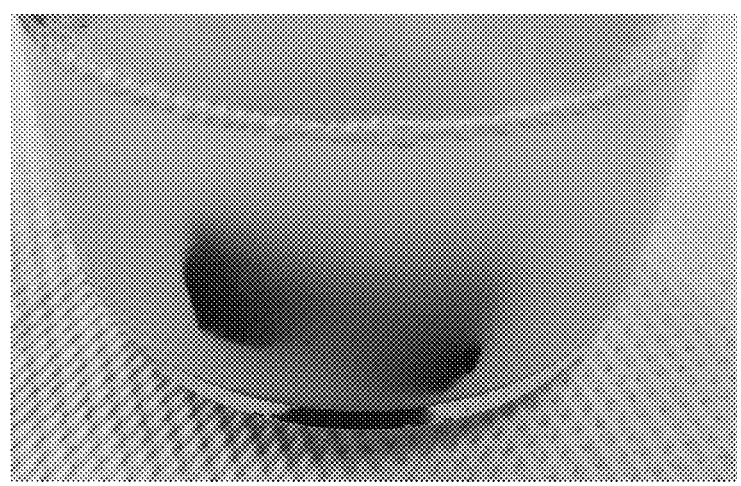
Figure 6C:
Figure 6D:
Figure 6E:
Figure 6F:
Figure 6G:

FIGS. 6A-G illustrate this experiment. FIG. 6A shows an agglomeration of HPAM taken from wellbore equipment in a beaker prior to the introduction of the breaker fluid. FIG. 6B shows the agglomeration of HPAM after being introduced to the breaker fluid disclosed herein after 1 day has passed. FIG. 6C shows the agglomeration of HPAM after being introduced to the breaker fluid disclosed herein after 2 days have passed. FIG. 6D shows the agglomeration of HPAM after being introduced to the breaker fluid disclosed herein after 3 days have passed. FIG. 6E shows the agglomeration of HPAM after being introduced to the breaker fluid disclosed herein after 4 days have passed. FIG. 6F shows the agglomeration of a HPAM after being introduced to the breaker fluid disclosed herein after 5 days have passed. FIG. 6G shows the agglomeration of HPAM after being introduced to the breaker fluid disclosed herein after 6 days have passed. After 6 days of contacting the agglomeration with the breaker fluid disclosed herein, FIG. 6G shows the agglomeration of HPAM was completely hydrolyzed and broken down by the breaker fluid.

Additional experiments were conducted with varying concentrations of breaker fluid constituents. Table 1 shows the efficacy of the breaker fluids disclosed herein on a drilling mud containing PHPAM, which has a starting pH of 9.0. This experiment was conducted in similar laboratory conditions as the experiment shown in FIGS. 6A-G, but at 80° C. for four hours. After four hours had passed, the resulting fluid generated from contacting the breaker fluid with the PHPAM was passed through a 100-mesh screen. The requisite is full, complete degradation within the time period in which the mesh screen is completely free of any residue and the filtrate (liquid volume passing through) contains no particles.

TABLE 1

Experiment No. 2.

| | | Test Fluid | | | | | | | |
|---|---|---|---|---|---|---|---|---|---|
| Component [%] | Control | Fluid 1 | Fluid 2 | Fluid 3 | Fluid 4 | Fluid 5 | Fluid 6 | Fluid 7 | Fluid 8 |
| Water | 85 | 86.9 | 81.2 | 79.2 | 79.2 | 86.9 | 83.75 | 84.9 | 84.5 |
| Organic acid | 7 | 0 | 5 | 7 | 7 | 5 | 7 | 7 | 7 |
| Complexing agent | 0 | 1 | 1 | 1 | 3 | 0 | 0 | 0 | 0 |
| Dispersant | 0 | 0.8 | 0.8 | 0 | 0.8 | 1 | 1 | 1 | 1 |
| Demulsifier | 0 | 0 | 0 | 0 | 0 | 0.1 | 0.25 | 0.1 | 0.5 |
| Corrosion Inhibitor | 0 | 1 | 1 | 1 | 1 | 1 | 1 | 1 | 1 |

TABLE 1-continued

Experiment No. 2.

| Component [%] | Control | Fluid 1 | Fluid 2 | Fluid 3 | Fluid 4 | Fluid 5 | Fluid 6 | Fluid 7 | Fluid 8 |
|---|---|---|---|---|---|---|---|---|---|
| Solvent Organic (Water Inmiscible) | 0 | 5 | 5 | 5 | 5 | 0 | 0 | 0 | 0 |
| Solvent Organic (Polar, Water Miscible) | 0 | 2 | 2 | 2 | 3 | 2 | 2 | 2 | 3 |
| Organic Oxidizer | 3 | 3 | 3 | 3 | 0 | 3 | 3 | 3 | 0 |
| Inorganic Oxidizer | 0 | 4.8 | 3.6 | 0 | 2.4 | 4.8 | 3.6 | 0 | 2.4 |
| Sludge Preventor | 0 | 1 | 1 | 2 | 1 | 1 | 1 | 1 | 1 |
| Organic electrolyte | 5 | 0 | 0 | 0 | 0 | 0 | 0 | 0 | 0 |
| Polymer (PHPA) Breakdown: | I | F | F | I | F | F | F | I | F |

\* I represents an incomplete breakdown and F represents a complete breakdown.
Control test. There is incomplete breakdown of the test fluid when only using an aqueous mixture composed of acetic acid and t-butylhydroperoxide (organic oxidizer), with an organic electrolyte which in this instance is very small molecular weight diquaternary ammonium salt hydroxylated in the C-2 position.
Fluid 1. The organic oxidizer and inorganic oxidizer (sodium perborate) combination, containing acetic acid completely breaks down the drilling mud-PHPAM.
Fluid 2. The organic oxidizer and inorganic oxidizer (sodium perborate) combination, containing acetic acid completely breaks down the drilling mud-PHPAM.
Fluid 3. The organic oxidizer alone, containing acetic acid, fails to completely break down the drilling mud-PHPAM. It is devoid of inorganic oxidizer.
Fluid 4. The inorganic oxidizer alone, containing acetic acid, completely breaks down the drilling mud-PHPAM. It is devoid of organic oxidizer.
Fluid 5. The organic oxidizer and inorganic oxidizer (sodium perborate) combination, containing acetic acid completely breaks down the drilling mud-PHPAM.
Fluid 6. The organic oxidizer and inorganic oxidizer (sodium perborate) combination, containing acetic acid completely breaks down the drilling mud-PHPAM.
Fluid 7. The organic oxidizer alone, containing acetic acid, fails to completely break down the drilling mud-PHPAM. It is devoid of inorganic oxidizer.
Fluid 8. The organic oxidizer alone, containing acetic acid, completely breaks down the drilling mud-PHPAM. It is devoid of inorganic oxidizer.

The breaker fluids disclosed herein may directly or indirectly affect one or more components or pieces of equipment associated with or which may come into contact with the breaker fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Provided are breaker fluids for treating a subterranean formation in accordance with the disclosure and the illustrated FIGS. An example breaker fluid comprises an acid, at least one oxidizer, a corrosion inhibitor, a surfactant, an asphaltene remover, a sludging inhibitor, and an aqueous base fluid.

Additionally or alternatively, the breaker fluids may include one or more of the following features individually or in combination. The acid may be an organic acid comprising a carboxylic acid chosen from the group consisting of: acetic acid, citric acid, lactic acid, thioglycolic acid, glycolic acid, sulfamic acid formic acid, propionic acid, butanoic acid, pentanoic acid, hexanoic acid, heptanoic acid, octanoic acid, nonanoic acid, decanoic acid, dodecanoic acid, palmitic acid, stearic acid, sebacic acid, phthalic acid, isophthalic acid, terephthalic acid, adipic acid, pamoic acid, suberic acid, succinic acid, traumatic acid, thapsic acid, valporic acid, hydroxypropionic acid, and any combinations thereof or as a mixture of two or more of these. Alternately or in addition to, the acid may be an acid precursor comprising an ester of an acid selected from the group consisting of: acetic acid, citric acid, lactic acid, thioglycolic acid, glycolic acid, sulfamic acid formic acid, propionic acid, butanoic acid, pentanoic acid, hexanoic acid, heptanoic acid, octanoic acid, nonanoic acid, decanoic acid, dodecanoic acid, palmitic acid, stearic acid, sebacic acid, phthalic acid, isophthalic acid, terephthalic acid, adipic acid, pamoic acid, suberic acid, succinic acid, traumatic acid, thapsic acid, valporic acid, hydroxypropionic acid, and any combinations thereof. The acid may be present in the breaker fluid at a concentration in a range of about 0.001% w/v to about 15% w/v. The acid may be an inorganic acid chosen from the group consisting of: hydrochloric acid, hydrobromic acid, phosphoric acid, hydrofluoric acid, hypochlorous acid, chlorous acid, derivatives thereof, and any combination thereof. The inorganic acid may be present in the breaker fluid at a concentration in a range of about 0.001% w/v to about 15% w/v. The at least one oxidizer may be a first oxidizer that is an inorganic persalt chosen from the group consisting of: alkali metal perborates, percarbonates, persulfates, persilicates, perpyrophosphates, and any combination thereof. The at least one oxidizer may be a second oxidizer and may be an organic peroxide having a formula of R—O—O—R': wherein-R and —R' are one of hydrogen, an alkyl, an aryl, or an acyl functional group. The total concentration of oxidizers in the breaker fluid may range from about 0.001% (w/v) to about 10% (w/v). The sludging inhibitor may be chosen from the group consisting of: ethoxylated alcohols, methanol, alkylbenzene sulfonate, or alkylbeneze. The total concentration of the sludging inhibitor in the breaker fluid may range from about 0.001% (w/v) to about 5% (w/v). The asphaltene remover may be chosen from the group consisting of: deasphalted oil or polar organic solvents wherein the polar solvents comprise heavy aromatic naphtha, cyclohexanone, N-methyl pyrrolidone, N-ethyl-2-pyrrolidone, dimethylformamide, or dimethyl sulfoxide. The total concentration of the asphaltene remover in the breaker fluid may range from about 0.001% (w/v) to about 5% (w/v).

The surfactant may be chosen from the group consisting of: ethoxylated nonyl phenol phosphate esters, nonionic surfactants, cationic surfactants, anionic surfactants, amphoteric/zwitterionic surfactants, alkyl phosphonate surfactants, linear alcohols, nonylphenol compounds, alkyoxylated fatty acids, alkylphenol alkoxylates, ethoxylated amides, ethoxylated alkyl amines, betaines, methyl ester sulfonates, hydrolyzed keratin, sulfosuccinates, taurates, amine oxides, alkoxylated fatty acids, alkoxylated alcohols, lauryl alcohol ethoxylate, ethoxylated nonyl phenol, ethoxylated fatty amines, ethoxylated alkyl amines, cocoalkylamine ethoxylate, betaines, modified betaines, alkylamidobetaines, cocamidopropyl betaine, quaternary ammonium compounds, trimethyltallowammonium chloride, or trimethylcocoammonium chloride. The total concentration of the surfactant in the breaker fluid may range from about 0.001% (w/v) to about 10% (w/v).

Provided are methods for treating a subterranean formation with a breaker fluid in accordance with the disclosure and the Illustrated FIGS. An example method comprises preparing a breaker fluid by combining an acid, at least one oxidizer, a corrosion inhibitor, a surfactant, an asphaltene remover, a sludging inhibitor, and an aqueous base fluid, introducing the breaker fluid into a wellbore penetrating the subterranean formation, and contacting the subterranean formation and wellbore equipment with the breaker fluid to remove agglomerations of polyacrylamide.

Additionally or alternatively, the method may include one or more of the following features individually or in combination. The wellbore may comprise a temperature of 300° F. or greater. The acid may be an organic acid comprising a carboxylic acid chosen from the group consisting of: acetic acid, citric acid, lactic acid, thioglycolic acid, glycolic acid, sulfamic acid formic acid, propionic acid, butanoic acid, pentanoic acid, hexanoic acid, heptanoic acid, octanoic acid, nonanoic acid, decanoic acid, dodecanoic acid, palmitic acid, stearic acid, sebacic acid, phthalic acid, isophthalic acid, terephthalic acid, adipic acid, pamoic acid, suberic acid, succinic acid, traumatic acid, thapsic acid, valporic acid, hydroxypropionic acid, and any combinations thereof or as a mixture of two or more of these. Alternately or in addition to, the acid may be an acid precursor comprising an ester of an acid selected from the group consisting of: acetic acid, citric acid, lactic acid, thioglycolic acid, glycolic acid, sulfamic acid formic acid, propionic acid, butanoic acid, pentanoic acid, hexanoic acid, heptanoic acid, octanoic acid, nonanoic acid, decanoic acid, dodecanoic acid, palmitic acid, stearic acid, sebacic acid, phthalic acid, isophthalic acid, terephthalic acid, adipic acid, pamoic acid, suberic acid, succinic acid, traumatic acid, thapsic acid, valporic acid, hydroxypropionic acid, and any combinations thereof. The acid may be present in the breaker fluid at a concentration in a range of about 0.001% w/v to about 15% w/v. The acid may be an inorganic acid chosen from the group consisting of: hydrochloric acid, hydrobromic acid, phosphoric acid, hydrofluoric acid, hypochlorous acid, chlorous acid, derivatives thereof, and any combination thereof. The inorganic acid may be present in the breaker fluid at a concentration in a range of about 0.001% w/v to about 15% w/v. The at least one oxidizer may be a first oxidizer that is an inorganic persalt chosen from the group consisting of: alkali metal perborates, percarbonates, persulfates, persilicates, perpyrophosphates, and any combination thereof. The at least one oxidizer may be a second oxidizer and may be an organic peroxide having a formula of R—O—O—R': wherein-R and —R' are one of hydrogen, an alkyl, an aryl, or an acyl functional group. The total concentration of the oxidizers in the breaker fluid may range from about 0.001% (w/v) to about 10% (w/v). The sludging inhibitor may be chosen from the group consisting of: ethoxylated alcohols, methanol, alkylbenzene sulfonate, or alkylbeneze. The total concentration of the sludging inhibitor in the breaker fluid may range from about 0.001% (w/v) to about 5% (w/v). The asphaltene remover may be chosen from the group consisting of: deasphalted oil or polar organic solvents wherein the polar solvents comprise heavy aromatic naphtha, cyclohexanone, N-methyl pyrrolidone, N-ethyl-2-pyrrolidone, dimethylformamide, or dimethyl sulfoxide. The total concentration of the asphaltene remover in the breaker fluid may range from about 0.001% (w/v) to about 5% (w/v). The surfactant may be chosen from the group consisting of: ethoxylated nonyl phenol phosphate esters, nonionic surfactants, cationic surfactants, anionic surfactants, amphoteric/zwitterionic surfactants, alkyl phosphonate surfactants, linear alcohols, nonylphenol compounds, alkyoxylated fatty acids, alkylphenol alkoxylates, ethoxylated amides, ethoxylated alkyl amines, betaines, methyl ester sulfonates, hydrolyzed keratin, sulfosuccinates, taurates, amine oxides, alkoxylated fatty acids, alkoxylated alcohols, lauryl alcohol ethoxylate, ethoxylated nonyl phenol, ethoxylated fatty amines, ethoxylated alkyl amines, cocoalkylamine ethoxylate, betaines, modified betaines, alkylamidobetaines, cocamidopropyl betaine, quaternary ammonium compounds, trimethyltallowammonium chloride, or trimethylcocoammonium chloride. The total concentration of the surfactant in the breaker fluid may range from about 0.001% (w/v) to about 10% (w/v).

Provided are systems for treating a subterranean formation with a breaker fluid in accordance with the disclosure and the illustrated FIGS. An example system comprises a breaker fluid comprising combining an acid, at least one oxidizer, a corrosion inhibitor, a surfactant, an asphaltene remover, a sludging inhibitor, and an aqueous base fluid. The system further comprises mixing equipment configured to mix the acid, the at least one oxidizer, a corrosion inhibitor, a surfactant, an asphaltene remover, a sludging inhibitor, and an aqueous base fluid. Additionally, the system comprises pumping equipment configured to pump the breaker fluid in the wellbore.

Additionally or alternatively, the system may include one or more of the following features individually or in combination. The acid may be an organic acid comprising a carboxylic acid chosen from the group consisting of: acetic acid, citric acid, lactic acid, thioglycolic acid, glycolic acid, sulfamic acid formic acid, propionic acid, butanoic acid, pentanoic acid, hexanoic acid, heptanoic acid, octanoic acid, nonanoic acid, decanoic acid, dodecanoic acid, palmitic acid, stearic acid, sebacic acid, phthalic acid, isophthalic acid, terephthalic acid, adipic acid, pamoic acid, suberic acid, succinic acid, traumatic acid, thapsic acid, valporic acid, hydroxypropionic acid, and any combinations thereof or as a mixture of two or more of these. Alternately, the acid may be an acid precursor comprising an ester of an acid selected from the group consisting of: acetic acid, citric acid, lactic acid, thioglycolic acid, glycolic acid, sulfamic acid formic acid, propionic acid, butanoic acid, pentanoic acid, hexanoic acid, heptanoic acid, octanoic acid, nonanoic acid, decanoic acid, dodecanoic acid, palmitic acid, stearic acid, sebacic acid, phthalic acid, isophthalic acid, terephthalic acid, adipic acid, pamoic acid, suberic acid, succinic acid, traumatic acid, thapsic acid, valporic acid, hydroxypropionic acid, and any combinations thereof. The acid may be present in the breaker fluid at a concentration in a range of about 0.001% w/v to about 15% w/v. The acid may be an inorganic acid chosen from the group consisting of: hydrochloric acid, hydrobromic acid, phosphoric acid, hydrofluoric acid, hypochlorous acid, chlorous acid, derivatives thereof, and any combination thereof. The inorganic acid may be present in the breaker fluid at a concentration in a range of about 0.001% w/v to about 15% w/v. The at least one oxidizer may be a first oxidizer that is an inorganic persalt chosen from the group consisting of: alkali metal perborates, percarbonates, persulfates, persilicates, perpyrophosphates, and any combination thereof. The at least one oxidizer may be a second oxidizer and may be an organic peroxide having a formula of R—O—O—R': wherein-R and —R' are one of hydrogen, an alkyl, an aryl, or an acyl functional group. The total concentration of the oxidizers in the breaker fluid may range from about 0.001% (w/v) to about 10% (w/v). The sludging inhibitor may be chosen from the group consisting of: ethoxylated alcohols, methanol, alkylbenzene sulfonate, or alkylbeneze. The total concentration of the sludging inhibitor in the breaker fluid may range from about 0.001% (w/v) to about 5% (w/v). The asphaltene remover may be chosen from the group consisting of: deasphalted oil or polar organic solvents wherein the polar solvents comprise heavy aromatic naphtha, cyclohexanone, N-methyl pyrrolidone, N-ethyl-2-pyrrolidone, dimethylformamide, or dimethyl sulfoxide. The total concentration of the asphaltene remover in the breaker fluid may range from about 0.001% (w/v) to about 5% (w/v). The surfactant may be chosen from the group consisting of: ethoxylated nonyl phenol phosphate esters, nonionic surfactants, cationic surfactants, anionic surfactants, amphoteric/zwitterionic surfactants, alkyl phosphonate surfactants, linear alcohols, nonylphenol compounds, alkyoxylated fatty acids, alkylphenol alkoxylates, ethoxylated amides, ethoxylated alkyl amines, betaines, methyl ester sulfonates, hydrolyzed keratin, sulfosuccinates, taurates, amine oxides, alkoxylated fatty acids, alkoxylated alcohols, lauryl alcohol ethoxylate, ethoxylated nonyl phenol, ethoxylated fatty amines, ethoxylated alkyl amines, cocoalkylamine ethoxylate, betaines, modified betaines, alkylamidobetaines, cocamidopropyl betaine, quaternary ammonium compounds, trimethyltallowammonium chloride, or trimethylcocoammonium chloride. The total concentration of the surfactant in the breaker fluid may range from about 0.001% (w/v) to about 10% (w/v).

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for treating a wellbore in a subterranean formation using a breaker fluid, the method comprising:
   providing the breaker fluid by combining an acid, an oxidizer, a corrosion inhibitor, a surfactant, an asphaltene remover, a sludging inhibitor, and an aqueous base fluid; wherein the acid is (i) an organic acid selected from the group consisting of acetic acid, methanesulfonic acid, propionic acid, p-toluenesulfonic acid, butanoic acid, derivatives thereof, and any combination thereof, or (ii) an inorganic acid selected from the group consisting of hydrochloric acid, hydrobromic acid, phosphoric acid, hydrofluoric acid, hypochlorous acid, chlorous acid, derivatives thereof, and any combination thereof; wherein the sludging inhibitor is selected from the group consisting of alkylbenzene sulfonate, alkylbenzene, or a combination thereof; wherein the breaker fluid comprises the acid in a concentration of 5% (w/v) to 15% (w/v);
   introducing the breaker fluid into the wellbore; and
   then contacting a surface contaminated with a polyolefin with the breaker fluid and thereby removing at least a portion of the polyolefin.

2. The method of claim 1, wherein the contaminated surface is a surface of a wellbore equipment.

3. The method of claim 2, wherein the method further comprises removing a second wellbore equipment from the wellbore, the second wellbore equipment comprising a surface contaminated with the polyolefin and contacting the contaminated surface of the second wellbore equipment with the breaker fluid after removal from the wellbore.

4. The method of claim 1, wherein the contaminated surface is a rock face within the subterranean formation.

5. The method of claim 1, further comprising introducing the breaker fluid into the wellbore after a drilling fluid has been introduced into the wellbore.

6. The method of claim 1, further comprising introducing the breaker fluid into the wellbore after a fracturing fluid has been introduced into the wellbore.

7. The method of claim 1, further comprising introducing the breaker fluid into a fracture within the subterranean formation.

* * * * *